Dec. 23, 1947.  S. B. MARTIN  2,433,230
PUSHER
Filed July 14, 1943  3 Sheets-Sheet 1
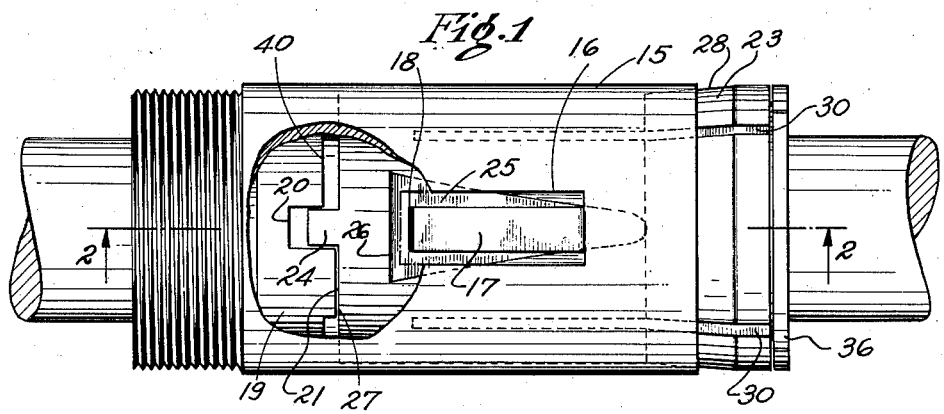
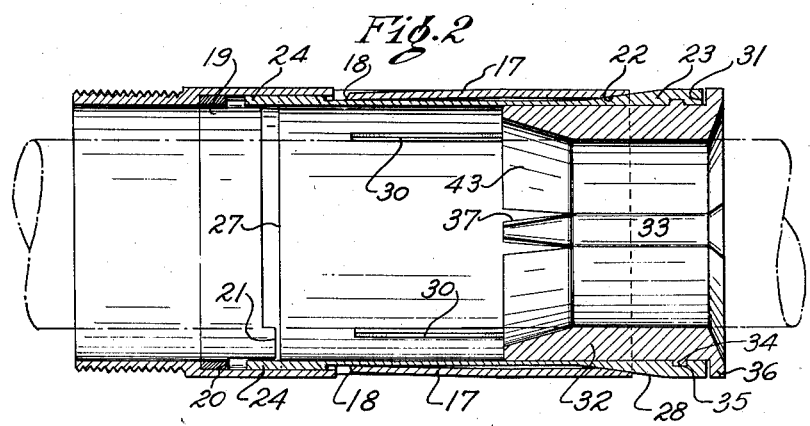
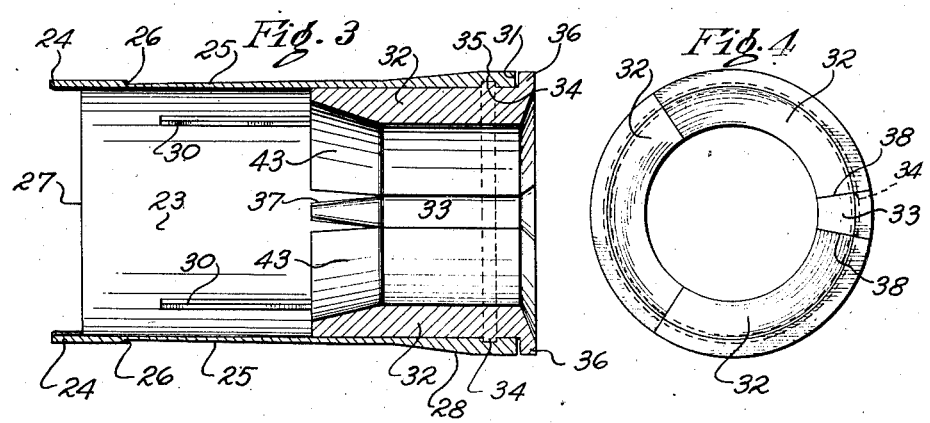
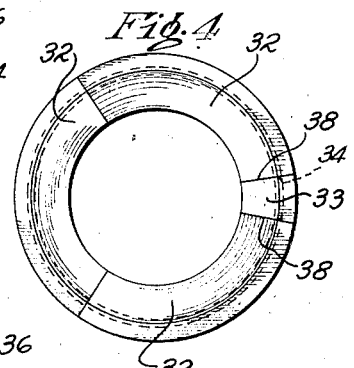
INVENTOR.
STODDARD B. MARTIN
BY Richey & Watts
ATTORNEYS

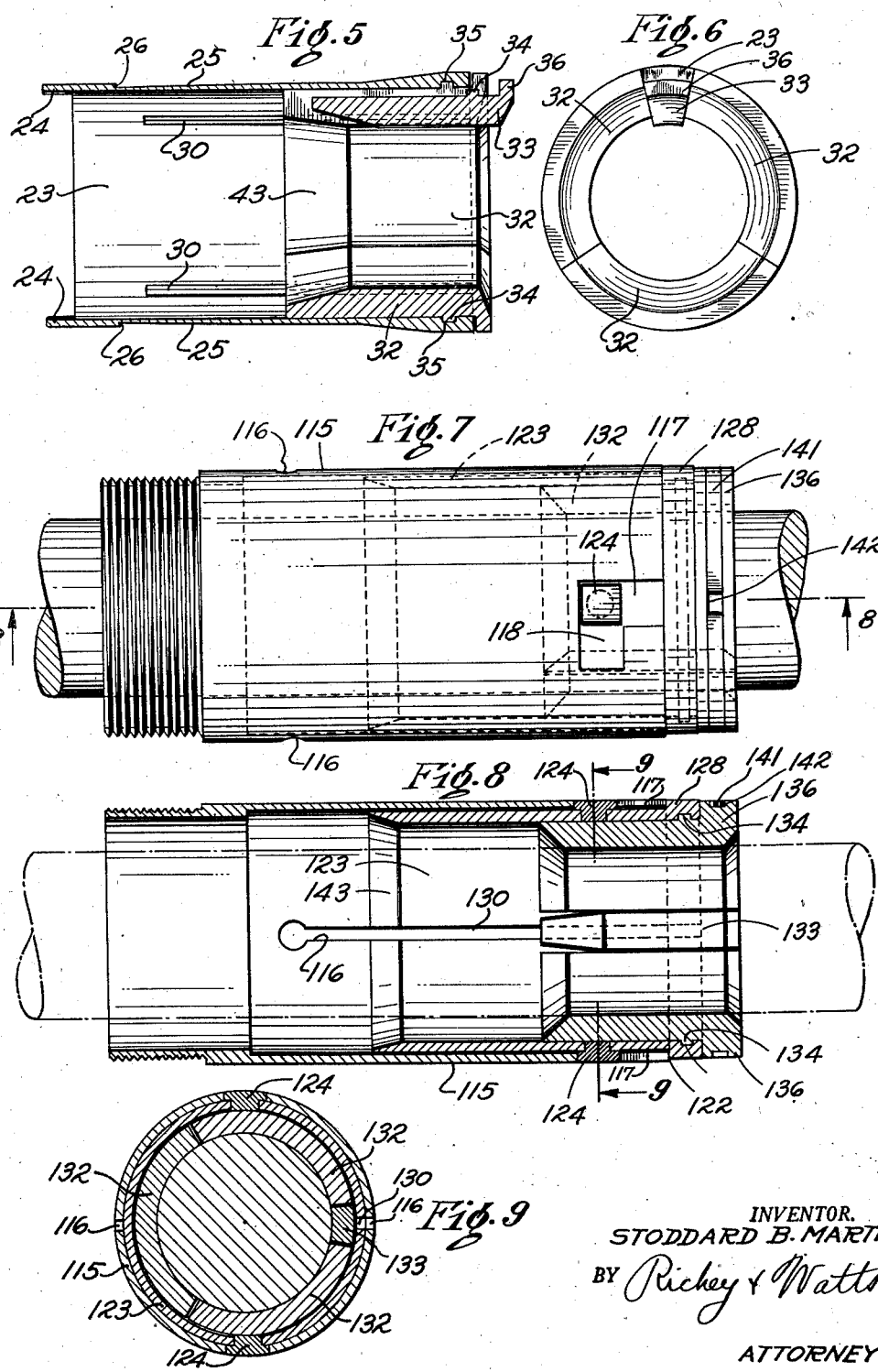

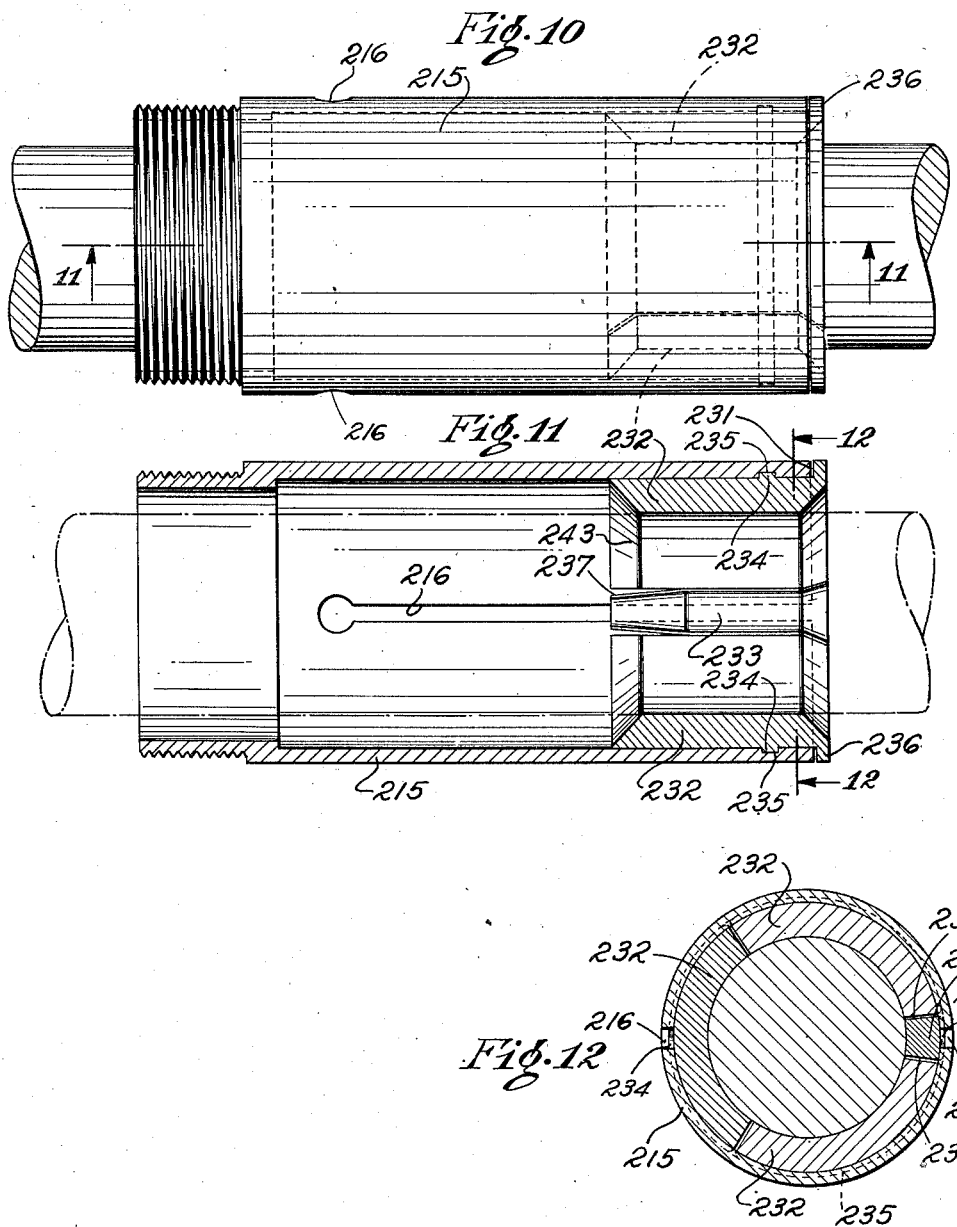

Patented Dec. 23, 1947

2,433,230

UNITED STATES PATENT OFFICE 2,433,230

PUSHER

Stoddard B. Martin, Cleveland, Ohio; Central National Bank of Cleveland, executor of said Stoddard B. Martin, deceased, assignor to Margaret J. Martin Application July 14, 1943, Serial No. 494,641

13 Claims. (Cl. 279—51)

This invention relates to pushers for automatic screw machines and the like.

The spindle of an automatic screw machine is ordinarily a hollow tube surrounding a collet tube which carries a collet to grip and rotate a bar of stock fed axially therethrough. At the end of each cycle of operations of the machine, the projecting end of stock is cut off from the bar, the collet opens, a new length of stock is fed forwardly and the collet is again closed to grip the stock and repeat the cycle of operations. The stock is ordinarily fed forward by a pusher or feed finger carried by a reciprocating pusher tube disposed within the collet tube.

It is desirable to construct the pusher as a master pusher; that is, with removable pads or bushings which can be assembled into a single shell to grip stock of various sizes. Many difficulties have been encountered, however, with such constructions. It is difficult to mount the removable pads or bushing in place in the pusher shell so that they are easily removed and replaced and securely held in position during operation, and so that the fastening means does not subtract from the limited space available within the collet tube and thus limit the maximum size of stock that may be used in the machine. In addition, in some types of pushers in which the pads are retained in position by fitting them within recesses in a resiliently collapsible shell, it has been found that the shell is prematurely fatigued and broken by repeatedly forcing it open sufficiently to permit removal or replacement of the pads or bushing. It is also desirable in some machines and with some classes of work to provide means for increasing the grip of the pusher on the feeding stroke, so that accurate and positive feeding is possible without marring the bar or excessively wearing the bearing surfaces of the pusher during the retracting stroke.

The principal object of the present invention is to mount removable pads in a collapsible tubular pusher member in such a manner that the pads are securely held in position during operation of the machine and at the same time may be readily removed and replaced without excessively stressing the collapsible tubular member. Other objects are to simplify the mounting of removable pads in a pusher member; to avoid limiting the maximum diameter of the stock that may be used in the machine; to adapt such removable pads to pushers of either the wedge gripping type or the spring gripping type; and to simplify and reduce the cost of pushers which may be used with adapters to provide either a wedge grip or a plain spring grip in the same machine.

Other objects and advantages more or less ancillary to the foregoing and the manner in which all the various objects are realized will appear in the following description, which considered in connection with the accompanying drawings, sets forth the preferred embodiment of the invention.

In the accompanying drawings:

Fig. 1 is a view in elevation, with parts broken away, of one embodiment of the present invention;

Fig. 2 is a longitudinal section taken on the line 2—2 of Fig. 1;

Fig. 3 is a longitudinal section through the bushing and pads removed from the shell;

Fig. 4 is an end view of the bushing and pads shown in Fig. 3;

Fig. 5 is a view corresponding to Fig. 3 showing the key pad partially removed;

Fig. 6 is an end view of the structure shown in Fig. 5;

Fig. 7 is an elevation of a different embodiment of the present invention;

Fig. 8 is a longitudinal section taken on the line 8—8 of Fig. 7;

Fig. 9 is a cross section taken on the line 9—9 of Fig. 8;

Fig. 10 is an elevational view of a further embodiment of the present invention;

Fig. 11 is a longitudinal section taken on the line 11—11 of Fig. 10; and

Fig. 12 is a cross section taken on the line 12—12 of Fig. 11.

Referring first to the embodiment illustrated in Figs. 1 to 6 inclusive, the reference numeral 15 designates a shell adapted to be secured to the end of a pusher tube. The shell is provided with one or more U-shaped cuts 16 through the wall thereof, each forming a tongue 17 integrally connected to the body of the shell and having a rearwardly directed free edge 18. In the embodiment disclosed two oppositely disposed tongues 17 are provided.

A sleeve 19 is secured to the inner surface of the shell 15 near its rearward end and is formed with notches 20 and projections 21 which serve as abutments. The forward edge of the shell 15 is uninterrupted circumferentially and is provided with a beveled portion 22. The tongues 17 are set inwardly from the normal contour of the shell 15 and spring tempered so as to press against the bushing contained within the shell.

A bushing 23 is arranged to be mounted in the shell for limited sliding movement with respect to the shell. As shown, the bushing is provided at its rear end with lugs 24 which are arranged to seat within the recesses 20 in the sleeve 19. The exterior surface of the bushing 23 is flattened as indicated at 25 forming forwardly facing shoulders 26 adapted to abut the rearwardly facing ends 18 of the tongues 17. In the illustrated embodiment two oppositely disposed flats 25 are shown cooperating with the two oppositely disposed tongues 17.

The rear end surface 27 of the bushing 23 intermediate the lugs 24 is arranged to engage the forward edges of the projections 21 to limit the rearward movement of the bushing 23 with respect to the shell 15. The engagement of the end surfaces 18 of the tongues 17 with the forwardly facing shoulders 26 limits the forward movement of the bushing 23 with respect to the shell 15. It will be apparent that with this arrangement the bushing can be simply pushed into the open end of the shell, rotated until the lugs 24 enter the recesses 20 and then further pushed into the shell, until the tongues 17 snap past the shoulders 26.

At its forward end the bushing 23 projects out of the open end of the shell 15 and is formed with a beveled surface 28 which cooperates with the beveled surface 22 of the shell. Sufficient clearance is allowed between the rear end 27 of the bushing 23 and the projections 21 to permit the bushing to move rearwardly with respect to the shell so that the cooperating beveled surfaces 22 and 28 serve to press the bushing inwardly upon the bar to be gripped.

The bushing 23 is provided with slots 30 extending rearwardly into the same from its forward edge 31. In the illustrated embodiment four equally spaced slots are cut in the bushing. The bushing is then set inwardly from its normal contour and spring tempered so as to provide a resilient force to grip the bar to be fed.

Pads 32 of a suitable thickness to grip the particular bar to be fed are secured in the forward end of the bushing 23. In the illustrated embodiment three pads 32 and one key pad 33 are used. Each pad 32 and 33 is formed with a circumferential rib segment 34 adapted to enter a correspondingly located groove 35 on the inner wall of the bushing 23. In addition each pad 32 and 33 is formed with a flange 36 fitting against the forward edge of the bushing 23.

The pads 32 are formed of such circumferential length that they may be inserted into the forward end of the bushing 23 when the same is collapsed and seated in position with their ribs 34 engaged in the groove 35 without spreading the forward end of the bushing 23. Thus these pads may be readily assembled by hand without the aid of any special tools. The key pad 33 has its rear end pointed, as indicated at 37, and has its opposite side edges 38 arranged at an angle to each other so that the key pad is wedge shaped in cross section, as shown in Fig. 4. After the pads 32 have been placed in position the pointed end 37 of the key pad 33 may be started between two adjacent side edges of the pads 32 and forced rearwardly so as to spread the pads 32 circumferentially against the tension of the bushing 23.

The rib 34 of the key pad 33 is forced into the groove 35 in the manner shown in Figs. 5 and 6. The pad 33 is pressed radially inward, further spreading the pads 32 circumferentially against the tension of the bushing 23, until the rib 34 of the pad 33 may pass under the forward edge of the bushing 23 and enter the groove 35. This may be readily done by hand by arranging the sides 38 of the pad 33 at a relatively small angle to each other so that only a slight amount of spreading of the bushing 23 is required to permit the rib 34 on the pad 33 to enter the groove 35.

I have found that the pads may be readily manipulated and assembled in the bushing 23 by making the angle between the sides 38 of the key pad 33 in the neighborhood of 22½°. Preferably the sides 38 of the pad 33 are cut radially with respect to the center of the bushing 23 and the side edges of the pads 32 are likewise radial, so that the pad 33 may be installed between any two of the pads 32. With this arrangement the circumferential length of the pad 33 in degrees is equal to the angle between the sides 38. However, it will be apparent that the angle between the sides 38 need not necessarily correspond to the circumferential length of the pad 33, and these sides need not be exactly radial, it being only necessary in this arrangement to cut the side edges of the pads 32 between which the pad 33 is to be installed to correspond with the sides 38 of the pad 33. While an angle between the sides 38 in the neighborhood of 22½° has been found to be most convenient to permit ready manipulation and installation of the pads and to securely hold the pads in place after they are installed, I have found that this angle may be increased to as much as about 60° in constructions in which the tension of the bushing 23 is sufficiently light.

After the key pad has been seated in position with its rib 34 in the groove 35 the circumferential length of all of the pads 32 and 33 is sufficient to spring the bushing 23 outwardly beyond its fully collapsed position so that all of the pads are spring pressed together circumferentially. In this condition the circumferential pressure exerted by the pads 32 on the sides 38 of the key pad 33 tends to force the pad 33 radially outward and thus holds its rib 34 firmly seated in the groove 35 against accidental displacement. To remove the pads it is only necessary to press the projecting flange 36 of the key pad 33 radially inward, spreading the pads 32 circumferentially a slight amount against the tension of the bushing 23, until the rib 34 clears the forward end of the bushing 23, after which the key 33 may be pulled forwardly out of the bushing. The pads 32 may be then removed by hand without stressing the bushing 23.

The bushing 23 with the pads 32 and 33 assembled therein cooperates with the shell 15 in the same general way as the constructions disclosed and claimed in my copending application Serial No. 390,601, filed April 26, 1941, now Patent No. 2,363,889. In normal operation in feeding a bar the shell 15 is moved forwardly by the pusher tube to advance the bar. During this action the bushing 23 first tends to remain stationary by reason of the spring grip of the pads 32 and 33 on the bar until the beveled edge 22 of the shell 15 rides up on the beveled surface 28 of the bushing. The grip of the pads on the bar is then increased sufficiently to impart a positive forward feeding movement to the bar. On the retracting stroke the shell 15 slides rearwardly over the bushing 23 until the edges 18 of the tongues 17 engage the forwardly facing shoulders 26 and pull the bushing 23 rearwardly over the bar. During this action the beveled edge 22 slides rearwardly with respect to the beveled surface 28, releasing the wedge grip.

When it is desired to withdraw a bar from the machine it is only necessary to force the bar forwardly until the tongues 17 engage the shoulders 26, at which time rear ends of the lugs 24 clear the forward edge 40 of the sleeve 19. The bar may then be turned by hand in the direction opposite to the normal direction of rotation until the lugs 24 ride upon the surface 40. The bar may then be withdrawn rearwardly from the machine without forcing the wedging surfaces 22 and 28 into engagement with each other. During normal operation the lugs 24 are prevented from escaping from the recesses 20 by engagement with the sides of the projections 21, which are so positioned as to contact the sides of the lugs 24 in the normal direction of rotation of the bar in the machine.

A slightly modified embodiment of the invention is illustrated in Figs. 7 to 9 inclusive. In this form the shell 115 is provided with oppositely disposed splits 116 extending rearwardly into the shell from its forward edge and the halves of the shell thus formed are set inwardly and spring tempered. The shell 115 is also formed with keyways 117 extending inwardly from the front face of the shell and communicating with notches 118. The bushing 123 is provided on its exterior surface with radial projections 124 adapted to slide rearwardly through the keyways 117 and to seat in the notches 118 when the bushing is turned in the normal direction of rotation of the machine.

In this embodiment the bushing 123 is illustrated as being formed with one slot 130 extending completely through the bushing in an axial direction. Thus the bushing is in effect a split cylinder which is then pressed inwardly from its normal contour and spring tempered so as to provide the desired spring tension. Likewise in this embodiment no wedging surfaces on the shell and bushing are employed, the forward edge of the bushing being simply formed with a rib 128 which abuts the forward edge 122 of the shell and limits rearward movement of the bushing with respect to the shell. Forward movement of the bushing with respect to the shell is prevented by the engagement of the projections 124 with the notches 118 in which the projections remain seated at all times during normal operation. To remove the bushing and its pads it is only necessary to turn the bushing within the shell in the direction opposite to the normal direction of rotation and pull the bushing forwardly out of the shell.

The pads 132 and 133 are constructed and operate in the same manner as the pads 32 and 33 previously described. In addition, however, the flanges 136 formed on the forward edges of the pads are made of sufficient width to receive a spring 141 seated in grooves 142. The spring 141 may provide some additional gripping force on the pads but is provided primarily to hold the pads assembled with respect to each other when they are removed from the bushing.

A further modified embodiment of the invention is illustrated in Figs. 10 to 12 inclusive. In this form the pusher shell 215 is formed to exert a spring pressure upon the stock and simply carries removable pads. As shown the shell is formed with two oppositely disposed slots 216 and the separated portions of the shell so formed are pressed inwardly from their normal contour before hardening and spring tempering the body of the shell so that the shell exerts an inward spring pressure upon the stock.

At its forward end the shell is formed interiorly with grooves 235. A plurality of pads 232 and a key pad 233 are formed to fit together to form an annulus larger than the collapsed internal diameter of the shell 215 and smaller than the stock to be gripped. Each pad is formed with a segmental rib 234 arranged to fit within the groove 235. Each pad is provided at its forward end with a flange 236 arranged to abut the forward edge 231 of the shell.

The key pad 233 is formed as in the embodiments previously described with a tapered rear end 237 to facilitate the assembly of the pads within the shell. The side edges 238 of the key pad 233 are arranged at a relatively small angle to each other as in the embodiments previously described. As illustrated the side edges 238 of the pad 233 are not exactly radial with respect to shell 215 so that the angular circumferential length of the pad 233 exceeds the angle between the side edges 238 of the pad.

With this type of construction the grip of the pusher is provided solely by the tension of the shell 215 and the gripping force is the same on both the advancing and retracting strokes of the pusher as in conventional pushers or feed fingers. The stock engaging pads are assembled in the pusher by inserting the pads 232 into the collapsed shell 215 and seating the ribs of the pads in the groove 235. Thereafter the key pad 233 is forced into position between the two pads 232 between which it is designed to fit, the pointed end 237 facilitating the entrance of the key pad into position. The combined circumferential length of the pads is such that the shell 215 must be expanded outwardly from its collapsed diameter in order to permit entrance of the pad 233. The pad 233 must be forced radially inward a sufficient distance to permit its rib 234 to be seated in the groove 235. The wedge shape of the pad provided by the side surfaces 238 expands the shell a relatively slight amount to permit the rib 234 to be seated in the groove. When all of the pads have been assembled the shell again contracts a slight amount and maintains the complete series of pads pressed against each other circumferentially. A component of this circumferential pressure acting against the inclined side edges 238 squeezes the pad 233 radially outward, thus preventing accidental displacement of the pad 233 and thereby retaining the entire set of pads in position.

In operation of each of the embodiments of the invention described the pads are expanded beyond their normal collapsed position so that their side edges no longer abut each other when stock is gripped by the pusher. In this condition, however, the pads are held against escaping from their position because they are gripped between the stock and resilient shell or sleeve. When no stock is gripped within the pusher the series of pads are pressed into circumferential contact and are thus retained in position. The forces resulting from rotation of the pusher tend to throw the pads radially outward against the shell and thus have no tendency to displace the pads from normal position. When a new piece of stock is pushed into the machine it engages the rear ends of the pads and expands them outwardly sufficiently to permit the stock to slide therethrough. The engagement of the stock against the ends of the pads applies an axial force to the pads which is resisted by the ribs 34, 134 or 234. To facilitate the insertion of a new bar of stock and to make certain that the contact of the bar with the ends of the pads does not displace them from their proper position the rear ends of the pads are preferably flared outwardly, as illustrated at 43 in Fig. 2, 143 in Fig. 8 and 243 in Fig. 11.

It will be understood that many of the features disclosed may be used in other embodiments of the invention. For example, the wedging engagement between the shell and the sleeve in the embodiment illustrated in Figs. 1 to 6 inclusive may be used in the embodiment shown in Figs. 7 to 9. Similarly the extension of the flanges on the pads to receive the spring 142 may be used in either of the other embodiments shown. Likewise the angular relation between the sides of the key pad may in any of the embodiments be radial, as shown in Figs. 1 to 9 inclusive, or other than radial as shown in Figs. 10 to 12. Many other modifications and rearrangements of the parts may be resorted to without departing from the scope of the invention as defined in the following claims.

I claim:

1. A pusher comprising a resilient tubular member adapted to surround stock to be fed, a plurality of segmental pads carried by said tubular member and arranged to grip the stock, said pads and tubular member being formed with interengaging abutment surfaces retaining said pads against axial movement with respect to said tubular member, said tubular member normally pressing said pads into circumferential engagement with each other when no stock is being gripped by the pusher, to hold said pads against radial displacement with respect to said tubular member, one of said pads having its side edges diverging outwardly, the included angle therebetween being less than sixty degrees, the remainder of said pads being of such circumferential length as to fit within said tubular member without stressing the same and being slidable circumferentially with respect to said tubular member so that said one pad may be forced into place after the remainder have been assembled in said member.

2. A pusher comprising a resilient tubular member adapted to surround stock to be fed, a plurality of segmental pads carried by said tubular member and arranged to grip the stock, said pads and tubular member being formed with interengaging abutment surfaces retaining said pads against axial movement with respect to said tubular member, said tubular member normally pressing said pads into circumferential engagement with each other when no stock is being gripped by the pusher, to hold said pads against radial displacement with respect to said tubular member, one of said pads having its side edges diverging outwardly, the included angle therebetween being less than thirty degrees, the remainder of said pads being of such circumferential length as to fit within said tubular member without stressing the same and being slidable circumferentially with respect to said tubular member so that said one pad may be forced into place after the remainder have been assembled in said member.

3. A pusher comprising a tubular shell having an open end, a resilient sleeve telescopically assembled within said shell with its forward end projecting from the open end of said shell, cooperating wedging surfaces on said shell and said sleeve arranged to force said sleeve radially inward when said shell moves axially in one direction with respect to said sleeve, cooperating abutments on said sleeve and shell to limit axial movement of said sleeve with respect to said shell in the other direction, and a plurality of pads adapted to engage stock to be fed removably mounted within said sleeve, said pads being positionable within said cooperating wedging surfaces after said resilient sleeve is assembled in said shell.

4. A pusher comprising a tubular shell having an open end, a resilient sleeve telescopically assembled within said shell with its forward end projecting from the open end of said shell, cooperating wedging surfaces on said shell and said sleeve arranged to force said sleeve radially inward when said shell moves axially in one direction with respect to said sleeve, cooperating abutments on said sleeve and shell to limit the axial movement of said sleeve with respect to said shell in the other direction, and a plurality of pads adapted to engage stock to be fed removably mounted within said sleeve, said pads being arranged to be forced into engagement with each other circumferentially by the tension of said sleeve when no stock is positioned within the pusher, and to be forced against the stock to be fed by the tension of said sleeve and the action of said cooperating wedging surfaces said pads being positionable within said sleeve after said sleeve is assembled in said shell.

5. A pusher comprising a resilient tubular member adapted to surround stock to be fed, a plurality of segmental pads carried by said tubular member and arranged to grip the stock, said tubular member and said pads being formed with cooperating abutment surfaces to retain said pads against axial movement with respect to said tubular member, one of said pads being of less circumferential extent than the remainder thereof and having its rear side edges converging to a point at the end thereof to facilitate insertion of said one pad into position within said member after the remaining pads have been assembled therein.

6. A pusher comprising a resilient tubular member adapted to surround stock to be fed, a plurality of segmental pads carried by said tubular member and arranged to grip the stock, said tubular member being formed with an internal annular groove and said pads being formed with segmental ribs adapted to fit within said groove, one of said pads being of less circumferential extent than the remainder thereof and having its side edges converging to a point at the rear end thereof to facilitate insertion of said one pad into position within said member after the remaining pads have been assembled therein.

7. A pusher comprising a resilient tubular member adapted to surround stock to be fed, a plurality of segmental pads carried by said tubular member and arranged to grip the stock, said tubular member being formed with an internal annular groove and said pads being formed with segmental ribs adapted to fit within said groove, said pads having radially projecting flanges at their forward edges adapted to engage the front edge of said member, one of said pads being of less circumferential extent than the remainder thereof and having its side edges converging to a point at the rear end thereof to facilitate insertion of said one pad into position within said member after the remaining pads have been assembled therein.

8. A pusher comprising a resilient tubular member adapted to surround stock to be fed, a plurality of segmental pads carried by said tubular member and arranged to grip the stock, said pads being formed to engage each other circumferentially to define with their exterior surfaces a cylinder larger than the collapsed internal diameter of said member, said tubular member being formed with an internal annular groove and said pads being formed with segmental ribs adapted to fit within said groove, said pads having radially projecting flanges at their forward edges adapted to engage the front edge of said member, one of said pads being of less circumferential extent than the remainder thereof and having its side edges converging to a point at the rear end thereof to facilitate insertion of said one pad into position within said member after the remaining pads have been assembled therein.

9. A pusher comprising a resilient shell adapted to surround stock to be fed, a collapsible bushing having means to engage the stock to be fed and adapted to be positioned within said shell, said shell being formed with an L-shaped slot cut through the wall thereof and opening through the front edge of said shell, said bushing being formed with a radial projection adapted to slide into said slot and to be turned into the L-shaped portion thereof to retain said bushing against axial movement with respect to said shell, and said bushing having a flange adapted to engage the front edge of said shell when said projection is turned into the L-shaped portion of said slot.

10. A pusher comprising a resilient shell adapted to surround stock to be fed, a collapsible bushing having means to engage the stock to be fed and adapted to be positioned within said shell, said shell being formed with a keyway cut through the wall thereof and opening through the front edge of said shell, said keyway communicating with a laterally extending recess cut through said shell and spaced from the front edge thereof, said bushing being formed with a radial projection adapted to slide into said keyway and to be turned into said recess to retain said bushing against axial movement with respect to said shell, and said bushing having a flange adapted to engage the front edge of said shell when said projection is turned into said recess.

11. A pusher comprising a resilient shell adapted to surround stock to be fed, a collapsible bushing adapted to be positioned within said shell, said shell being formed with a keyway cut through the wall thereof and opening through the front edge of said shell, said keyway communicating with a laterally extending recess cut through said shell and spaced from the front edge thereof, said bushing being formed with a radial projection adapted to slide into said keyway and to be turned into said recess to retain said bushing against axial movement with respect to said shell, and a plurality of pads removably carried within said bushing and adapted to engage the stock to be fed.

12. A pusher comprising a resilient tubular member adapted to surround stock to be fed, a plurality of segmental pads carried by said tubular member and arranged to grip the stock, said pads and tubular member being formed with interengaging abutment surfaces retaining said pads against axial movement with respect to said tubular member, said tubular member normally pressing said pads into circumferential engagement with each other when no stock is being gripped by the pusher, to hold said pads against radial displacement with respect to said tubular member, one of said pads being relatively narrow circumferentially and having its side edges converging to a point at the rear end thereof to facilitate insertion of said one pad into position within said member after the remaining pads have been assembled therein.

13. A pusher comprising a resilient tubular member adapted to surround stock to be fed, a plurality of segmental pads carried by said tubular member and arranged to grip the stock, said pads and tubular member being formed with interengaging abutment surfaces retaining said pads against axial movement with respect to said tubular member, said tubular member normally pressing said pads into circumferential engagement with each other when no stock is being gripped by the pusher, to hold said pads against radial displacement with respect to said tubular member, the side edges of said pads being formed substantially radially with respect to said tubular member, one of said pads being relatively narrow circumferentially and having its rear end pointed, the remainder of said pads being of such length as to fit within said tubular member without stressing the same, whereby said one pad may be forced into place after the remainder have been assembled in said member.

STODDARD B. MARTIN.

REFERENCES CITED

The following references are of record in the file of this patent:

UNITED STATES PATENTS

| Number | Name | Date |
|---|---|---|
| 1,983,950 | Sheffer | Dec. 11, 1934 |
| 2,155,019 | Martin | Apr. 18, 1939 |
| 2,187,090 | Martin | Jan. 16, 1940 |
| 2,232,534 | Jarman | Feb. 18, 1941 |
| 2,299,972 | Gallen et al. | Oct. 27, 1942 |
| 1,184,068 | Brophy | May 23, 1916 |
| 1,876,765 | Scharff | Sept. 13, 1932 |
| 1,937,236 | Laughlin | Nov. 28, 1933 |
| 2,069,775 | Rich | Feb. 9, 1937 |
| 1,964,941 | Gustafson | July 3, 1934 |

FOREIGN PATENTS

| Number | Country | Date |
|---|---|---|
| 465,852 | France | Apr. 29, 1914 |
| 552,687 | France | May 4, 1923 |